US012699712B1

(12) United States Patent
Buchman

(10) Patent No.: US 12,699,712 B1
(45) Date of Patent: Aug. 4, 2026

(54) VECTOR DATABASE SMART AUTO-SCALING

(71) Applicant: Dell Products L.P., Round Rock, TX (US)

(72) Inventor: Ophir Jehoshua Buchman, Raanana (IL)

(73) Assignee: Dell Products L.P., Houston, TX (US)

( * ) Notice: Subject to any disclaimer, the term of this patent is extended or adjusted under 35 U.S.C. 154(b) by 0 days.

(21) Appl. No.: 19/175,202

(22) Filed: Apr. 10, 2025

(51) Int. Cl.
*G06F 16/00* (2019.01)
*G06F 9/50* (2006.01)
*G06F 16/22* (2019.01)
*G06F 16/27* (2019.01)

(52) U.S. Cl.
CPC .......... *G06F 16/278* (2019.01); *G06F 9/5083* (2013.01); *G06F 16/2237* (2019.01)

(58) Field of Classification Search
None
See application file for complete search history.

(56) References Cited

U.S. PATENT DOCUMENTS

| | | | | |
|---|---|---|---|---|
| 12,353,383 | B1 * | 7/2025 | Bao ..................... | G06F 16/2237 |
| 2009/0254971 | A1 * | 10/2009 | Herz ..................... | G06Q 10/10 |
| | | | | 726/1 |
| 2013/0097664 | A1 * | 4/2013 | Herz ..................... | G06Q 30/02 |
| | | | | 726/1 |
| 2013/0204990 | A1 * | 8/2013 | Skjolsvold ............ | G06F 16/278 |
| | | | | 709/223 |

| | | | | |
|---|---|---|---|---|
| 2016/0004571 | A1 * | 1/2016 | Smith ................... | G06F 16/278 |
| | | | | 718/105 |
| 2017/0262521 | A1 * | 9/2017 | Cho ..................... | G06F 16/2471 |
| 2018/0131757 | A1 * | 5/2018 | Helmich ............... | G06F 16/25 |
| 2022/0272148 | A1 * | 8/2022 | Shraer .................... | G06F 16/00 |
| 2024/0064196 | A1 * | 2/2024 | Shraer .................... | G06F 16/00 |

(Continued)

FOREIGN PATENT DOCUMENTS

CN 119201442 A * 12/2024 ........... G06F 16/901

OTHER PUBLICATIONS

Hu, Guoyu, Shaofeng Cai, Tien Tuan Anh Dinh, Zhongle Xie, Cong Yue, Gang Chen, and Beng Chin Ooi. "HAKES: Scalable vector database for embedding search service." arXiv preprint arXiv:2505. 12524 (2025). (Year: 2025).*

(Continued)

*Primary Examiner* — Farhan M Syed
(74) *Attorney, Agent, or Firm* — Chamberlain, Hrdlicka, White, Williams & Aughtry; Aly Z. Dossa

(57) ABSTRACT

A method for processing requests from edge devices includes receiving a read request from an edge device, wherein the read request comprises a search vector, identifying partitions of a plurality of partitions based on a comparison of centroids associated with each partition of the plurality of partitions and the search vector to obtain similar partitions, wherein each partition of the similar partitions comprises a plurality of read replicas. Further the method includes identifying, for each of the similar partitions, a read replica of the plurality of read replicas with a lowest load to obtain lowest load read replicas, identifying vectors in each of the lowest load read replicas that are above a similarity threshold when compared to the search vector, and sending the vectors to the edge device.

17 Claims, 5 Drawing Sheets

(56) References Cited

U.S. PATENT DOCUMENTS

2024/0419907 A1*  12/2024  Laprise ................. G01C 21/32
2026/0042204 A1*  2/2026  Anwar .................... B25J 9/163

OTHER PUBLICATIONS

Curino, Carlo, Evan Philip Charles Jones, Yang Zhang, and Samuel R. Madden. "Schism: a workload-driven approach to database replication and partitioning." (2010). (Year: 2010).*

Pan, James Jie, Jianguo Wang, and Guoliang Li. "Vector database management techniques and systems." In Companion of the 2024 International Conference on Management of Data, pp. 597-604. 2024. (Year: 2024).*

* cited by examiner

VECTOR DATABASE SMART AUTO-SCALING

BACKGROUND

Vector databases are becoming increasingly essential within computational systems, particularly in handling high-dimensional data and complex query operations. These databases frequently experience performance bottlenecking under significant operational loads. Such bottlenecks may be mitigated by employing partitioned and duplicated databases via read replicas to distribute the load.

BRIEF DESCRIPTION OF DRAWINGS

Certain embodiments of the disclosure will now be described with reference to the accompanying drawings. However, the accompanying drawings illustrate only certain aspects or implementations of the disclosure by way of example and are not meant to limit the scope of the claims.

DETAILED DESCRIPTION

Figure 1:
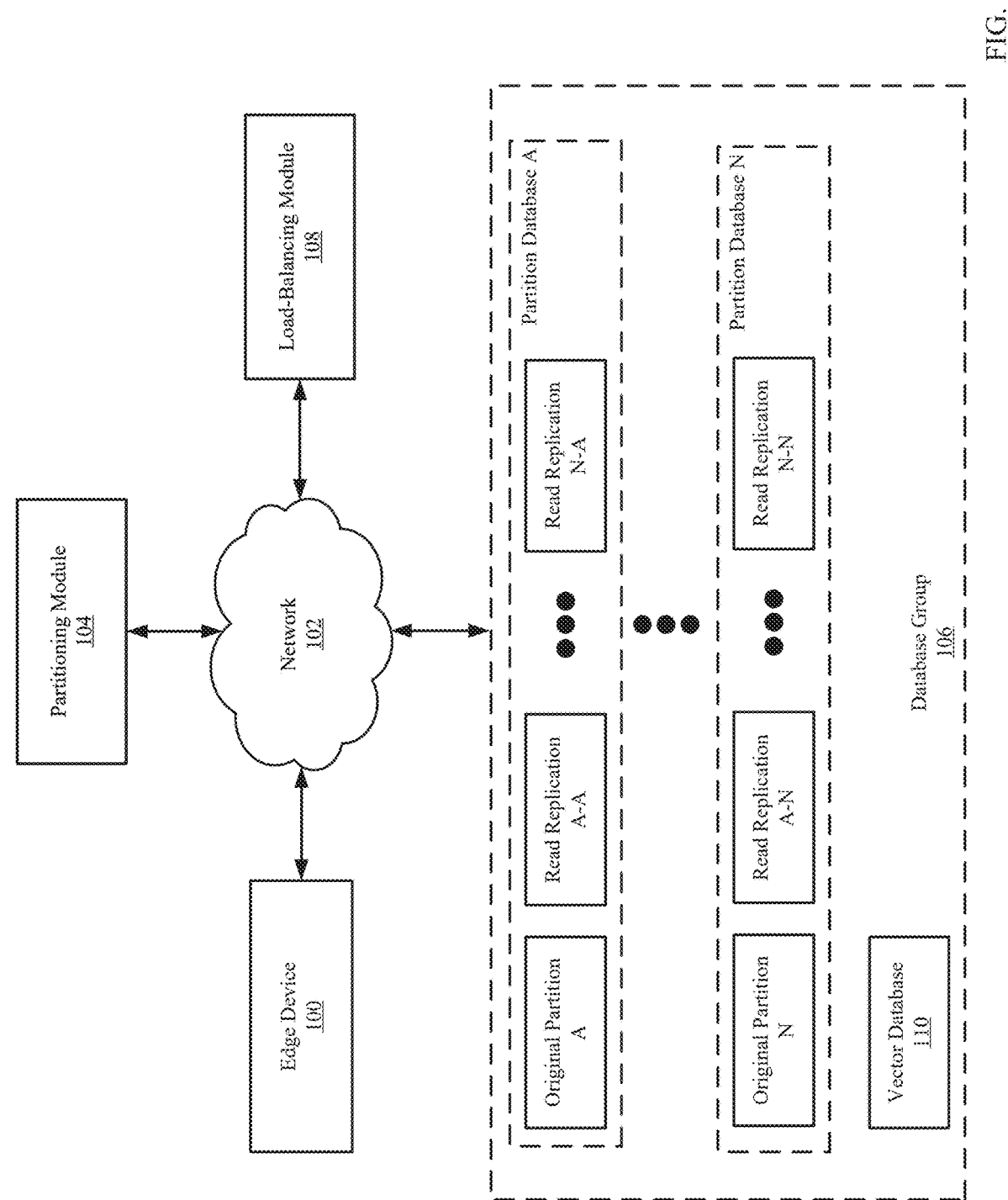
FIG. 1 shows a diagram of a system in accordance with one or more embodiments.

Vector databases are specialized for handling high-dimensional vector data. These databases are becoming more common as they are essential for various artificial intelligence and machine learning applications. Some everyday use cases of vector databases include enabling semantic search within search engines, improving natural language processing by capturing contextual meanings, improving image and video recognition by categorizing visual content, and improving anomaly detection by identifying unusual patterns and outliers in data. However, traditional vector databases frequently experience bottlenecks from high volumes of requests and the complexity of handling high-dimensional data, leading to increased costs and reduced efficiency.

When performance and efficiency decline, partitioning the vector databases becomes necessary. Partitioning involves dividing a single database into multiple partitions allowing for horizontal scaling, making searches faster and more efficient. Horizontal scaling or sharding is performed by splitting the vectors into rows, with different ranges of rows stored on different partitions. However, horizontal scaling introduces significant challenges. Horizontal scaling can lead to uneven load distribution because some partitions may receive more load than others, leading to bottlenecks for those partitions. Each partition is often individually managed and equipped with its own computing memory and storage resources, and organizations typically incur higher infrastructure costs as resources are added. Further, complex datasets exacerbate these issues, requiring intensive management. Alternatively, read replicas of the vector database can be created to offload some of the load on the original vector database, allowing it to scale up beyond capacity constraints for read-heavy workloads. However, these replicas are often billed as separate database instances and become costly, especially with large databases. Thus, there is a clear need for an updated vector database solution.

In light of the issues discussed above, the disclosure includes a system that partitions a vector database based on the similarity of the vectors in the vector database, places the partitions on separate databases (i.e., partition databases), creates read replicas of each partition, and uses a load balancer to add and remove read replicas from the partition databases based upon the load (i.e., read request traffic). When the system receives a read request, including a search vector, the system compares the centroid of each partition to the search vector to identify and obtain vectors relevant to the search vector. This solution solves the uneven distribution problem resulting from horizontal scaling by adding or removing read replicas based upon the load on each of the partition databases to offset the load. Further, this solution results in cost savings because it eliminates the need to replicate the entire vector database, instead, the system only creates read replicas for partitions with heavy load. This system results in increased efficiency, increased performance, and reduced cost.

Specific embodiments will now be described with reference to the accompanying figures.

FIG. 1 shows a system in accordance with one or more embodiments. The system may include an edge device (100), a network (102), a partitioning module (104), a database group (106), and a load-balancing module (108). The system may include additional, fewer, and/or different components without departing from the scope of the embodiments disclosed herein. Each component may be operably/operatively connected to any of the other components via any combination of wired and/or wireless connections. Each of these system components is described below.

In one or more embodiments, the edge device (100), the partitioning module (104), the database group (106), and the load-balancing module (108) may be operatively connected to one another through the network (102) (e.g., a local area network (LAN), a wide area network (WAN) such as the Internet, a mobile network, any other network type, or a combination thereof). Further, the network (102) may encompass various interconnected, network-enabled sub-components (or systems) (e.g., switches, routers, gateways, etc.) that may facilitate communications between the aforementioned components. Moreover, the edge device (100), the partitioning module (104), the database group (106), and the load-balancing module (108) may communicate with one another using any combination of wired and/or wireless communication protocols.

In one or more embodiments, the edge device (100) may be a physical device such as a personal computing system (e.g., a laptop, a cell phone, a tablet computer, a server, etc.) configured for hosting one or more workloads, or for providing a computing environment whereon workloads may be implemented. For example, the edge device (100) may be a computing system (e.g., 500, FIG. 5) as discussed below in more detail in FIG. 5. In one or more embodiments, the edge device (100) may include a user interface (e.g., a graphical user interface) (not shown) that allows a user to interact with applications running on the edge device (100).

In one or more embodiments, the edge device (100) may include any number of applications (and/or content accessible through the applications) that provide computer-implemented services to a user. In one or more embodiments, the applications communicate with the database group (106) to aid in the functionality of the applications. For example, the applications may search data stored on the database group (106) to aid in providing an output to a query submitted to an artificial intelligence-based application. As such, in one or more embodiments, the applications can perform read operations on the vector database (110) and/or the partition database (e.g., partition databases A through N). Further, in one or more embodiments, the applications can perform write operations only to the vector database (110). In one or more embodiments, the applications may include but should not be limited to word processing applications, spreadsheet applications, email applications/clients, database applications, presentation applications, calendar applications, etc. Applications may be designed and configured to perform one or more functions instantiated by a user of the edge device (100). In order to provide application services, each application may host similar or different components. The components may be, for example (but not limited to), instances of databases, instances of email servers, etc. Applications may be executed on one or more edge device(s) (100) as instances of the application.

Applications may vary in different embodiments, but in certain embodiments, applications may be custom-developed or commercial (e.g., off-the-shelf) applications that a user desires to execute on the edge device (100). In one or more embodiments, applications may be logical entities executed using computing resources of the edge device (100). For example, applications may be implemented as computer instructions stored on persistent storage of the edge device (100) that when executed by the processor(s) of the edge device (100), cause the edge device (100) to provide the functionality of the applications described throughout the application.

In one or more embodiments, while performing, for example, one or more operations requested by a user, applications installed on the edge device (100) may include functionality to request and use physical and logical resources of the edge device (100). Applications may also include functionality to use data stored in storage/memory resources of the edge device (100). The applications may perform other types of functionalities not listed above without departing from the scope of the embodiments disclosed herein. While providing application services to a user, applications may store data that may be relevant to the user in storage/memory resources of the edge device (100).

In one or more embodiments, to provide services to the users, the edge device (100) may utilize, rely on, or otherwise cooperate with an infrastructure node (IN) (not shown). For example, the edge device (100) may issue requests to the IN to receive responses and interact with various components of the IN. The edge device (100) may also request data from and/or send data to the IN (for example, the edge device (100) may transmit information to the IN that allows the IN to perform computations, the results of which are used by the edge device (100) to provide services to the users). As yet another example, the edge device (100) may utilize computer-implemented services provided by the IN. When the edge device (100) interacts with the IN, data that is relevant to the edge device (100) may be stored (temporarily or permanently) in the IN.

In one or more embodiments, the edge device (100) may be capable of, for example: (i) collecting users' inputs, (ii) correlating collected users' inputs to the computer-implemented services to be provided to the users, (iii) communicating with INs that perform computations necessary to provide the computer-implemented services, (iv) using the computations performed by the infrastructure nodes to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the edge device (100) may provide computer-implemented services to users (and/or other computing devices). The edge device (100) may provide any number and any type of computer-implemented services. To provide computer-implemented services, an edge device (100) may include a collection of physical components (e.g., processing resources, storage/memory resources, networking resources, etc.) configured to perform operations of the edge device (100) and/or otherwise execute a collection of logical components (e.g., virtualization resources) of the edge device (100).

Figure 2:
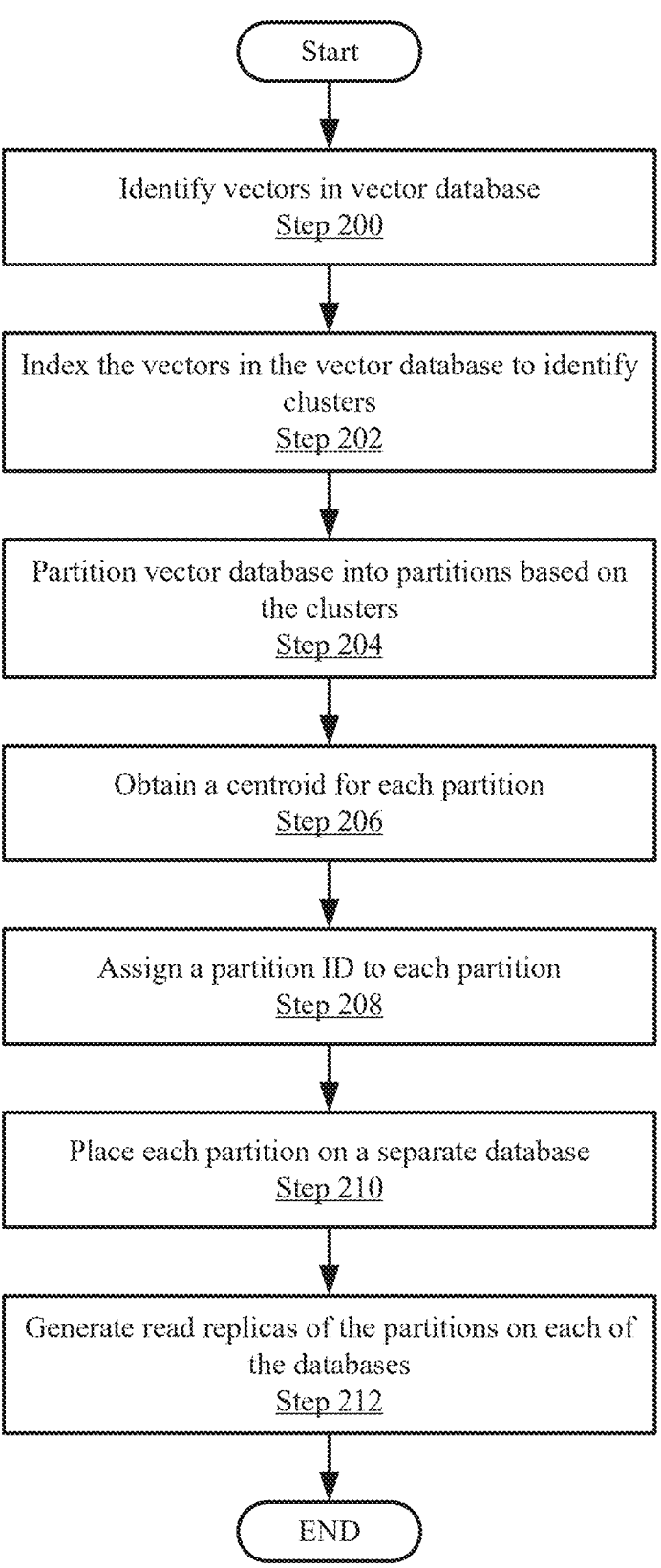
FIG. 2 shows a flowchart of a method for partitioning a vector database in accordance with one or more embodiments.
Figure 3:
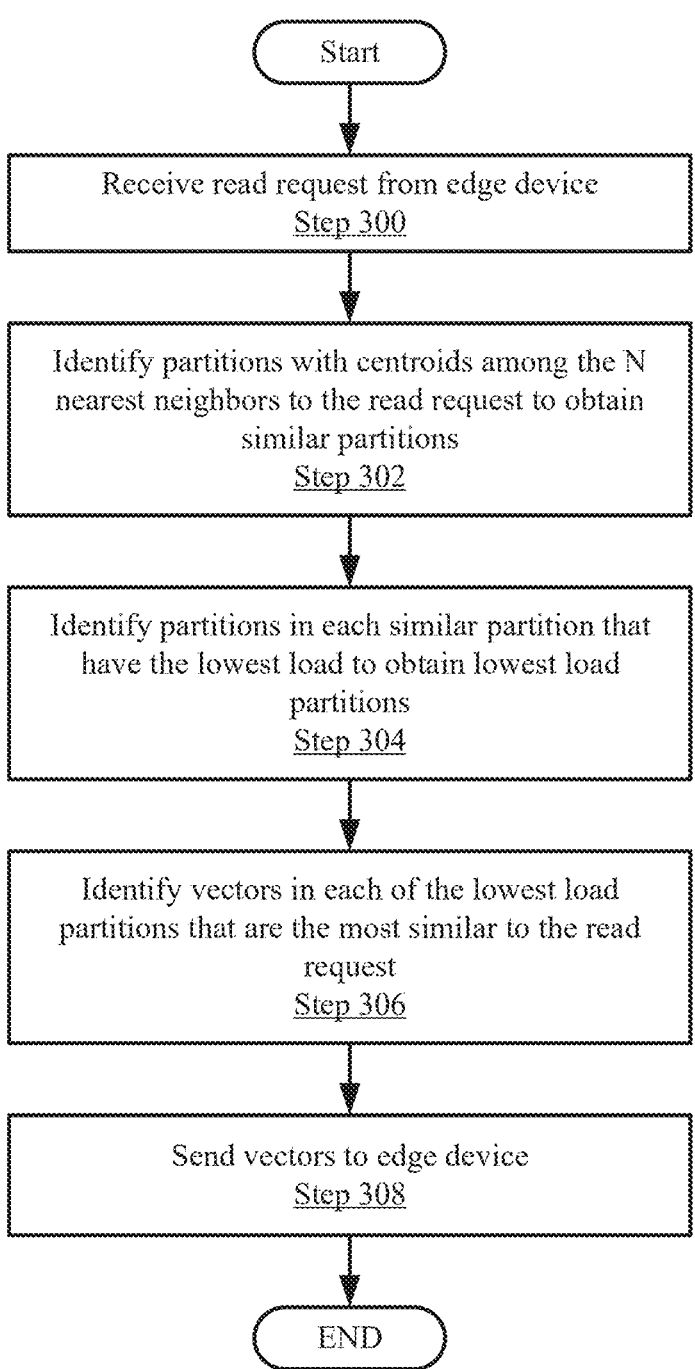
FIG. 3 shows a flowchart of a method for processing read requests in accordance with one or more embodiments.
Figure 4:
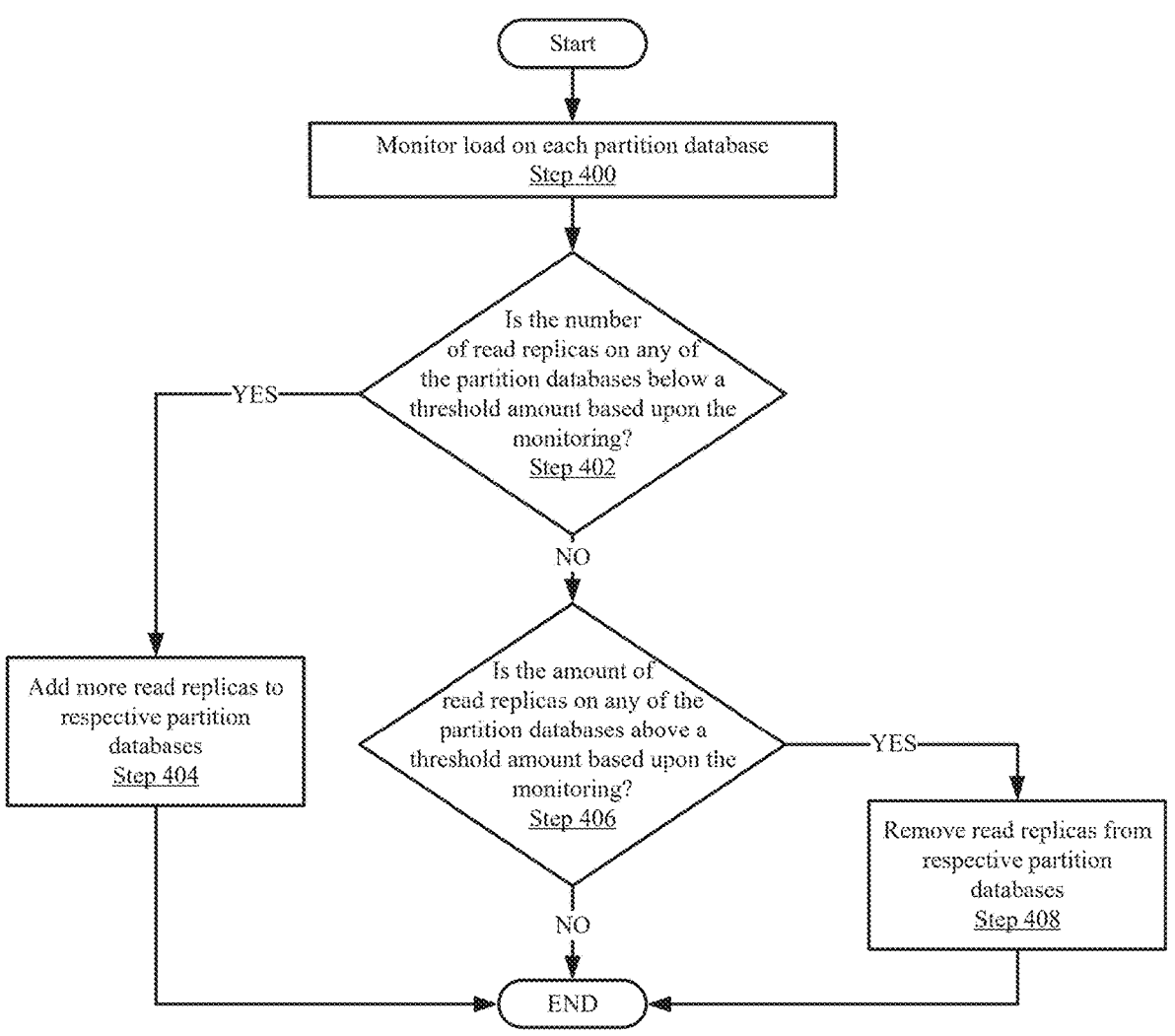
FIG. 4 shows a flowchart of a method for monitoring load on read replicas in accordance with one or more embodiments.

Further, the edge device (100) may include functionality to perform at least a portion of the methods shown in FIGS. 2-4. One of ordinary skill in the art will appreciate that the edge device (100) may perform other functionalities without departing from the scope of the embodiments disclosed herein.

In one or more embodiments, the partitioning module (104) includes the functionality to partition a vector database (110) into partitions based on the similarity of vectors in the vector database (110). In one more embodiment, the vector database (110) includes one or more vectors. In one or more embodiments, a vector refers to an ordered list of numerical values representing data. In one or more embodiments, the partitioning module (104) utilizes K-Means clustering, Inverted File Flat clustering, or any other similar indexing method to cluster (i.e., group similar vectors based on shared features) the vectors before partitioning. Further, the partitioning module (104) may include functionality to perform at least a portion of the methods shown in FIGS. 2-4. One of ordinary skill in the art will appreciate that the partitioning module (104) may perform other functionalities without departing from the scope of the embodiments disclosed herein.

In one or more embodiments, the database group (106) includes the functionality to identify vectors in response to a read request. In one or more embodiments, a read request refers to a request to access and view data without modifying it. In one or more embodiments, the read request includes a search vector (i.e., a numerical representation of a query used to find similar items based on vector similarity). In one or more embodiments, the database group (106) identities partitions by any means known in the art or discovered in the future, including but not limited to N nearest neighbor as described in FIG. 3. In one or more embodiments, the database group (106) is made up of A-N partition databases. In one or more embodiments, each partition database is associated with a separate partition of the vector database (110). In one or more embodiments, each partition database includes A-N read replicas of the original partition contained within the vector database (110). In one or more embodiments, read replicas refer to read-only copies of the original partition used to improve performance and scalability by offloading traffic from the original partition. In one or more embodiments, each of the A-N partition databases is on a separate server (not shown). Further, the database group (106) may include functionality to perform at least a portion of the methods shown in FIGS. 2-4. One of ordinary skill in the art will appreciate that the database group (106) may perform other functionalities without departing from the scope of the embodiments disclosed herein.

In one or more embodiments, the load-balancing module (108) includes the functionality to monitor the load on partition databases. In one or more embodiments, load refers to volume of read request traffic on read replicas within their respective partition database. In one or more embodiments, the load-balancing module (108) includes the functionality to add or remove read replicas from the partition databases based upon the monitoring. Further, the load-balancing module (108) may include functionality to perform at least a portion of the methods shown in FIGS. 2-4. One of ordinary skill in the art will appreciate that the load-balancing module (108) may perform other functionalities without departing from the scope of the embodiments disclosed herein.

Figure 5:
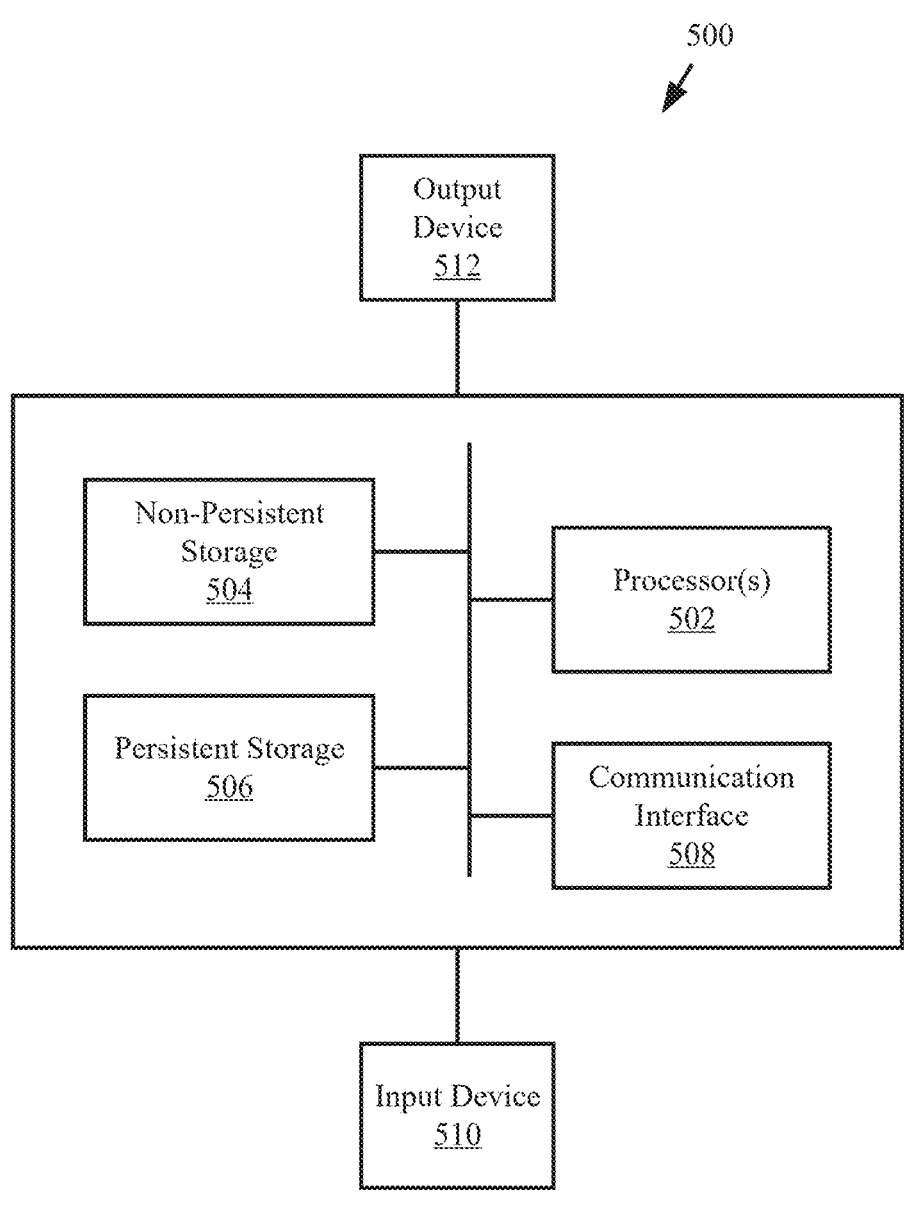
FIG. 5 shows a diagram of a computing system in accordance with one or more embodiments.

In one or more embodiments, the edge device (100), the partitioning module (104), the database group (106), and the load-balancing module (108) are each implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device cause the computing device to perform the functionality of the edge device (100), the partitioning module (104), the database group (106), and the load-balancing module (108) described throughout this application.

In one or more embodiments, the edge device (100), the partitioning module (104), the database group (106), and the load-balancing module (108) are each implemented as a logical device. The logical device may utilize the computing resources of any number of computing devices and thereby provide the functionality of the edge device (100), the partitioning module (104), the database group (106), and the load-balancing module (108).

Turning to FIG. 2, FIG. 2 shows a flowchart of a method for partitioning a vector database in accordance with one or more embodiments disclosed herein. The method may be performed by, for example, a partitioning module (e.g., 104 in FIG. 1). Other components in the system may perform this method without departing from the scope of the disclosure.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 2 may be performed concurrently with one or more steps in FIGS. 2-4.

In step 200, the partitioning module identifies vectors in a vector database (e.g., 110, FIG. 1). In one or more embodiments, a vector refers to an ordered list of numerical values representing data. In one or more embodiments, the partitioning module identifies the vectors by any means known in the art or discovered in the future. In a non-limiting example, the vectors are [5,6,7], [9,10,4], [11,9,5], [6,6,8], [7,6,6], and [10,11,3].

In step 202, the partitioning module indexes the vectors in the vector database to identify clusters. In one or more embodiments, clusters refer to a group of vectors that have similar features (i.e., individual attributes or properties that define vectors in a dataset). In one or more embodiments, the partitioning module indexes the vectors by comparing the features of each vector in the vector database to features of other vectors in the vector database to identify similarities. In one more embodiments, the similarity of the vectors' features is determined by the vectors' proximity in space. Continuing with the non-limiting example in step 200, vectors [5,6,7], [6,6,8], and [7,6,6] are close in proximity, and vectors [9,10,4], [11,9,5], [10,11,3] are close in proximity and thus are identified as cluster one and cluster two, respectively. In one or more embodiments, the partitioning module indexes the vectors in the vector database to identify clusters by indexing methods known in the art or discovered in the including but not limited to K-Means clustering, Inverted File Flat clustering, etc.

In step 204, the partitioning module partitions the vector database into partitions based on the clusters. In one or more embodiments, the partitioning module partitions the vector database into partitions by any means known in the art or discovered in the future. Continuing with the non-limiting example in step 202, the vectors in cluster one (i.e., [5,6,7], [6,6,8], and [7,6,6]) are placed in partition one and the vectors in cluster two (i.e., [9,10,4], [11,9,5], [10,11,3]) are placed in partition two.

In step 206, the partitioning module obtains a centroid (i.e., the average of all vectors in a partition) for each partition. Continuing with the non-limiting example, the centroid of partition one is [6,6,7], and the centroid of partition two is [10,10,4]. In one or more embodiments, the partitioning module obtains the centroids by any means known in the art or discovered in the future. In one or more embodiments, the centroids are stored in a centroid database (not shown), a partitioning module (e.g., 104, FIG. 1), or a load-balancing module (e.g., 108, FIG. 1).

In step 208, the partitioning module assigns a partition ID to each of the partitions. In one or more embodiments, the vectors are populated with an additional data item (e.g., as a new column, row, etc., depending on the database structure) indicating their respective partition ID. Continuing with the non-limiting examples in step 204, since vectors [5,6,7], [6,6,8], and [7,6,6] are in partition one, they would now be [5,6,7,1], [6,6,8,1], and [7,6,6,1] and since vectors [9,10,4], [11,9,5], [10,11,3] are in partition two, they would now be [9,10,4,2], [11,9,5,2], [10,11,3,2]. In one or more embodiments, the partition IDs are used to identify the partitions to which the vectors belong. As such, organizing and identifying the partitions is quickly and easily enabled using the existing vector database structure In step 210, the partitioning module places each of the partitions on a separate database (i.e., partition databases) within a database group (e.g., 106 in FIG. 1). In one or more embodiments, the partitioning module places each partition on a separate database by any means known in the art or discovered in the future. In one or more embodiments, each partition database in the database group is on its own server.

In step 212, the partitioning module generates read replicas of the partitions (i.e., original partitions) on each of the partition databases, as shown in FIG. 1. In one or more embodiments, each partition database includes an original partition and A-N read replicas of the original partition as shown in FIG. 1. In one or more embodiments, read replicas refer to read-only copies of the original partition used to improve performance and scalability by offloading traffic from the original partition. In one or more embodiments, a load-balancing module (e.g., 108 in FIG. 1) constantly monitors the load on each of the partition databases as discussed in FIG. 4. In one or more embodiments, load refers to volume of read request traffic on read replicas within their respective partition database. In one or more embodiments, the load-balancing module adds or removes read replicas from the partition databases based upon the monitoring as discussed in FIG. 4. It should be further appreciated, that generating read replicas for each partition rather than for the entire vector database results in increased efficiency and reduced cost. In a non-limiting example, partition database one is under high load while partition database two is under low load, thus, it is more cost-effective to make small read replicas of the partition database that is under a lot of load (i.e., partition database one) rather than large read replicas of the entire vector database.

In one or more embodiments, the method ends following step 212.

Turning to FIG. 3, FIG. 3 shows a flowchart of a method for processing read requests in accordance with one or more embodiments disclosed herein. The method may be performed by, for example, a database group (e.g., 106 in FIG. 1). Other components in the system may perform this method without departing from the scope of the disclosure.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 3 may be performed concurrently with one or more steps in FIGS. 2-4.

In step 300, the database group receives a read request from an edge device (e.g., 100 in FIG. 1). In one or more embodiments, read requests refer to a request to access and view data without modifying it. In one or more embodiments, the read request includes a search vector (i.e., a numerical representation of a query used to find similar items based on vector similarity). In one or more embodiments, the database group is the same database group from FIG. 2. In one or more embodiments, the database group includes partition databases, each with one or more vectors as described in FIG. 2. In one or more embodiments, the partition databases are the same partition databases as in FIG. 2.

In step 302, the database group identifies partitions within the partition databases with centroids among the N nearest neighbors to the search vector to obtain similar partitions. In one or more embodiments, N nearest neighbor refers to the set of N centroids that are closest in space to the search vector. In one or more embodiments, N is determined dynamically or set manually depending on the context of use or the precision required by the search. In one or more embodiments, N is determined by any means known in the art or discovered in the future. In one or more embodiments, N is pre-selected by a user. In one or more embodiments, each of the partition databases contains read replicas of the partitions they are associated with, as described in FIG. 2.

In step 304, the database group uses a load-balancing module (e.g., 108 in FIG. 1) to identify the partitions with the lowest load within the partition databases associated with the similar partitions to obtain lowest load partitions. In one or more embodiments, load refers to volume of read request traffic on partitions within their respective partition database. In one or more embodiments, the load-balancing module identifies the partitions with the lowest load by any means known in the art or discovered in the future. As a non-limiting example, partitions A, D, and F are identified in step 302 and partition A has three available partitions:

original partition A, read replica A-A, and read replica A-B; partition D has two available partitions: original partition D and read replica D-A; and partition F has five available partitions: original partition F, read replica F-A, read replica F-B, read replica F-C, and read replica F-D. Continuing the example, in step 304, the following partitions are identified as the lowest load partitions: read replica A-A amongst the three partition A partitions, original partition D amongst the two partition D partitions, and read replica F-C amongst the five partition F partitions.

In step 306, the database group identifies vectors in each of the lowest load partitions that are most similar (i.e., closest in space) to the search vector. In a non-limiting example, if the search vector is [1,6,3], similar vectors may be [1,5,3] and [2,6,3] because they are very close in space to [1,6,3]. In one or more embodiments, the database group uses vector IDs, as described in FIG. 2, to identify the vectors. In one or more embodiments, the database group identifies the vectors by any means known in the art or discovered in the future. It should be appreciated, that the vectors that are close in space are likely to contain information relevant to the search vector.

In step 308, the database group sends the vectors to the edge device. In one or more embodiments, a model takes the vectors as an input and outputs results. In one or more embodiments, the results are in natural language text. In one or more embodiments, the model is a large language model. In one or more embodiments, the edge device presents the results to a user via a graphical user interface.

In one or more embodiments, the method ends following step 308.

Turning to FIG. 4, FIG. 4 shows a flowchart of a method for monitoring load on read replicas in accordance with one or more embodiments disclosed herein. The method may be performed by, for example, a load-balancing module (e.g., 108 in FIG. 1). Other components in the system may perform this method without departing from the scope of the disclosure.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4 may be performed concurrently with one or more steps in FIGS. 2-4.

In step 400, the load-balancing module monitors the load on each partition database in the database group (e.g., 106 in FIG. 1). In one or more embodiments, load refers to volume of read request traffic on read replicas within their respective partition database. In one or more embodiments, the database group is the same database group form FIGS. 2-3. In one or more embodiments, the database group is made up of A-N partition databases, as shown in FIG. 1. In one or more embodiments, each partition database is associated with a separate partition of a vector database. In one or more embodiments, each partition database includes an original partition (i.e., a partition of the vector database) and A-N read replicas of the original partition, as shown in FIG. 1. In one or more embodiments, the load-balancing module monitors the load by any means known in the art or discovered in the future. In one or more embodiments, read replicas refer to read-only copies of the original partition used to improve performance and scalability by offloading traffic from the original partition. In one or more embodiments, the load-balancing module constantly monitors the load on the partition database.

In step 402, the load-balancing module determines whether the number of read replicas on any of the partition databases is below a threshold amount based on the monitoring. In one or more embodiments, being below the threshold amount refers to exceeding the maximum allowable traffic on all of the read replicas on a partition database. It should be appreciated, that exceeding the maximum allowable traffic is an indicator that more read replicas need to be added to a respective partition database(s). In one or more embodiments, the threshold amount may be determined by load capacity of the read replicas. In one or more embodiments, the threshold amount may be determined by a user. In one or more embodiments, the threshold amount may be determined by any means known in the art or discovered in the future. In one or more embodiments, the load-balancing module determines whether the number of read replicas on any of the partition databases is below the threshold amount by any means known in the art or discovered in the future. If the result is YES, then the method proceeds to step 404. If the result is NO, then the method proceeds to step 406.

In step 404, the load-balancing module adds more read replicas to the partition databases that are below the threshold amount. In one or more embodiments, the load-balancing module adds read replicas until all of the partition databases are within a threshold range. It should be appreciated, that the threshold range indicates a region that is neither above nor below the threshold. In one or more embodiments, the threshold range is determined by the load capacity of the read replicas. In one or more embodiments, the threshold range is determined by the user. In one or more embodiments, the threshold range is determined by any means known in the art or discovered in the future. In one or more embodiments, the load-balancing module may add read replicas to the partition databases by any means known in the art or discovered in the future.

In step 406, the load-balancing module determines whether the number of read replicas on any of the partition databases is above a threshold amount based on the monitoring. In one or more embodiments, being above the threshold amount refers to a state in which the number of read replicas on a respective partition database exceeds what is necessary given the current traffic levels. It should be appreciated, that exceeding what is necessary, given the current traffic levels, is an indicator that read replicas need to be removed from a respective partition database(s) because the respective partition database (a) is being under-utilized. In one or more embodiments, the load-balancing module determines whether the number of read replicas on any of the partition databases is above a threshold amount by any means known in the art or discovered in the future. If the result is YES, then the method proceeds to step 408. If the result is NO, then the method ends.

In step 408, the load-balancing module removes read replicas from the partition databases that are above the threshold amount. In one or more embodiments, the load-balancing module removes read replicas until all of the partition databases are within the threshold range. In one or more embodiments, the load-balancing module may remove read replicas from the partition databases by any means known in the art or discovered in the future. It should be appreciated, that removing read replica from a partition database(s) that is being underutilized results in cost and energy savings to the system.

In one or more embodiments, the method ends following step 408.

Embodiments of the disclosure may be implemented using computing devices. Turning to FIG. 5, FIG. 5 shows a diagram of a computing device (500) in accordance with one or more embodiments. The computing device (500) may include one or more computer processor(s) (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), input devices (510), output devices (512), and numerous other elements (not shown) and functionalities. Each of these components is described below.

In one embodiment, the computer processor(s) (502) may be an integrated circuit for processing instructions. For example, the computer processor(s) (502) may be one or more cores or micro-cores of a processor. The computing device (500) may also include one or more input devices (510), such as a touchscreen, access keyboard, mouse, microphone, touchpad, electronic pen, or any other type of input device. The communication interface (508) may include an integrated circuit for connecting the computing device (500) to a network (e.g., 102 in FIG. 1) (e.g., a local area network (LAN), a wide area network (WAN) such as the Internet, mobile network, or any other type of network) and/or to another device, such as another computing device.

In one embodiment, the computing device (500) may include one or more output devices (512), such as a screen (e.g., a liquid crystal display (LCD), a plasma display, touchscreen, cathode ray tube (CRT) monitor, projector, or other display device), a printer, external storage, or any other output device. One or more of the output devices (512) may be the same or different from the input devices (510). The input and output device(s) (510, 512) may be locally or remotely connected to the computer processor(s) (502), non-persistent storage (504), and persistent storage (506). Many diverse types of computing devices exist, and the aforementioned input and output device(s) (510, 512) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

In the detailed description of the embodiments of the disclosure above, numerous specific details are set forth in order to provide a more thorough understanding of one or more embodiments of the disclosure. However, it will be apparent to one of ordinary skill in the art that the one or more embodiments of the disclosure may be practiced without these specific details. In other instances, well-known features have not been described in detail to avoid unnecessarily complicating the description.

In the prior description of the figures, any component described with regard to a figure, in various embodiments of the disclosure, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components.

Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connection between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage module, a diskette, a tape, flash memory, physical memory, or any other physical computer readable storage medium. Specifically, the software instructions may correspond to computer readable program code that, when executed by a processor(s), is configured to perform one or more embodiments described herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims below.

What is claimed is:

1. A method for processing requests from edge devices, the method comprising:
   identifying vectors in a vector database;
   indexing the vectors in the vector database to identify clusters;

partitioning, based on the clusters, the vector database to obtain a plurality of partitions;
   obtaining a centroid for each partition of the plurality of partitions;
   placing each partition of the plurality of partitions on a separate database;
   generating read replicas for each partition of the plurality of partitions, wherein each partition of the plurality of partitions is associated with a plurality of read replicas, wherein each read replica comprises a full read-only copy of its associated partition;
   receiving, following the generating, a read request from an edge device, wherein the read request comprises a search vector;
   identifying partitions of the plurality of partitions based on a comparison of centroids associated with each partition of the plurality of partitions and the search vector to obtain similar partitions;
   identifying, for each of the similar partitions, a read replica of the plurality of read replicas with a lowest load to obtain lowest load read replicas;
   identifying vectors in each of the lowest load read replicas that are above a similarity threshold when compared to the search vector; and
   sending the vectors to the edge device.

2. The method of claim 1, further comprising:
   receiving outputs from a model using the vectors as inputs to the model; and
   presenting the outputs to a user via a graphical user interface.

3. The method of claim 2, wherein the model comprises a large language model.

4. The method of claim 1, wherein load refers to volume of read request traffic on a respective read replica.

5. The method of claim 1, wherein identifying clusters comprises:
   comparing at least one feature of each vector to the at least one feature of other vectors in the vector database.

6. The method of claim 1, further comprising:
   monitoring load on each partition of the plurality of partitions;
   making a determination, based upon the monitoring, that a number of read replicas associated with a partition of the plurality of partitions is above a threshold; and
   removing, based upon the determination, at least one of the number of read replicas from respective partitions.

7. A non-transitory computer readable medium (CRM) comprising computer readable program code, which when executed by a computer processor, enables the computer to perform a method for processing requests from edge devices, the method comprising:
   identifying vectors in a vector database;
   indexing the vectors in the vector database to identify clusters;
   partitioning, based on the clusters, the vector database to obtain a plurality of partitions;
   obtaining a centroid for each partition of the plurality of partitions;
   placing each partition of the plurality of partitions on a separate database;
   generating read replicas for each partition of the plurality of partitions, wherein each partition of the plurality of partitions is associated with a plurality of read replicas, wherein each read replica comprises a full read-only copy of its associated partition;

receiving, following the generating, a read request from an edge device, wherein the read request comprises a search vector;

identifying partitions of the plurality of partitions based on a comparison of centroids associated with each partition of the plurality of partitions and the search vector to obtain similar partitions;

identifying, for each of the similar partitions, a read replica of the plurality of read replicas with a lowest load to obtain lowest load read replicas;

identifying vectors in each of the lowest load read replicas that are above a similarity threshold when compared to the search vector; and sending the vectors to the edge device.

8. The non-transitory CRM of claim 7, further comprising:

receiving outputs from a model using the vectors as inputs to the model; and presenting the outputs to a user via a graphical user interface.

9. The non-transitory CRM of claim 8, wherein the model comprises a large language model.

10. The non-transitory CRM of claim 7, wherein load refers to volume of read request traffic on a respective read replica.

11. The non-transitory CRM of claim 7, wherein identifying clusters comprises:

comparing at least one feature of each vector to the at least one feature of other vectors in the vector database.

12. The non-transitory CRM of claim 7, further comprising:

monitoring load on each partition of the plurality of partitions;

making a determination, based upon the monitoring, that a number of read replicas associated with a partition of the plurality of partitions is above a threshold; and removing, based upon the determination, at least one of the number of read replicas from respective partitions.

13. A system for processing requests from edge devices, the system comprising:

persistent storage; and a computing device, comprising a processor and memory, programmed to:

identify vectors in a vector database;

index the vectors in the vector database to identify clusters;

partition, based on the clusters, the vector database to obtain a plurality of partitions;

obtain a centroid for each partition of the plurality of partitions;

place each partition of the plurality of partitions on a separate database;

generate read replicas for each partition of the plurality of partitions, wherein each partition of the plurality of partitions is associated with a plurality of read replicas, wherein each read replica comprises a full read-only copy of its associated partition;

receive a read request from an edge device, wherein the read request comprises a search vector;

identify partitions of a plurality of partitions based on a comparison of centroids associated with each partition of the plurality of partitions and the search vector to obtain similar partitions, wherein each partition of the similar partitions is associated with a plurality of read replicas;

identify, for each of the similar partitions, a read replica of the plurality of read replicas with a lowest load to obtain lowest load read replicas;

identify vectors in each of the lowest load read replicas that are above a similarity threshold when compared to the search vector; and send the vectors to the edge device.

14. The system of claim 13, wherein the computing device is further programmed to:

receive outputs from a model using the vectors as inputs to the model; and present the outputs to a user via a graphical user interface.

15. The system of claim 14, wherein the model comprises a large language model.

16. The system of claim 13, wherein load refers to volume of read request traffic on a respective read replica.

17. The system of claim 13, wherein the computing device is further programmed to:

monitor load on each partition of the plurality of partitions;

make a determination, based upon the monitoring, that a number of read replicas associated with a partition of the plurality of partitions is above a threshold; and remove, based upon the determination, at least one of the number of read replicas from respective partitions.

* * * * *